United States Patent
Alegria et al.

(10) Patent No.: US 7,024,629 B2
(45) Date of Patent: Apr. 4, 2006

(54) SYSTEM AND METHOD FOR PROCESSING USER-SELECTED HYPERLINKS ON A WEB PAGE

(75) Inventors: Andrew P. Alegria, Nampa, ID (US); Brett A. Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 09/939,630

(22) Filed: Aug. 28, 2001

(65) Prior Publication Data

US 2003/0043193 A1    Mar. 6, 2003

(51) Int. Cl.
  *G06F 3/00* (2006.01)
  *G06F 17/00* (2006.01)

(52) U.S. Cl. .............. 715/739; 715/760; 715/513; 715/501.1

(58) Field of Classification Search .......... 707/2, 707/3, 10, 102, 104.1; 345/749, 738, 776, 345/760, 716, 853, 854; 715/749, 738, 776, 715/760, 716, 853, 854, 739; 705/26, 27

See application file for complete search history.

(56) References Cited

U.S. PATENT DOCUMENTS

| | | | | |
|---|---|---|---|---|
| 6,021,409 | A * | 2/2000 | Burrows | 707/102 |
| 6,035,330 | A * | 3/2000 | Astiz et al. | 709/218 |
| 6,055,538 | A * | 4/2000 | Kessenich et al. | 707/101 |
| 6,237,006 | B1 * | 5/2001 | Weinberg et al. | 707/103 R |
| 6,292,802 | B1 * | 9/2001 | Kessenich et al. | 707/101 |
| 6,344,851 | B1 * | 2/2002 | Roberts et al. | 345/418 |
| 6,405,192 | B1 * | 6/2002 | Brown et al. | 707/3 |
| 6,411,307 | B1 * | 6/2002 | Rosin et al. | 345/716 |
| 6,486,895 | B1 * | 11/2002 | Robertson et al. | 345/776 |
| 6,523,037 | B1 * | 2/2003 | Monahan et al. | 707/10 |
| 6,667,751 | B1 * | 12/2003 | Wynn et al. | 345/833 |
| 6,670,968 | B1 * | 12/2003 | Schilit et al. | 715/760 |
| 2005/0021862 | A1 * | 1/2005 | Schroeder et al. | 709/246 |

\* cited by examiner

*Primary Examiner*—Kristine Kincaid
*Assistant Examiner*—Lê Nguyen

(57) ABSTRACT

The invention is a method, a computer readable medium and a system for improving performance of a graphical user interface (GUI). In one respect, the invention is a method for improving performance of a GUI. The method comprises identifying a plurality of links, wherein the identifying is performed in response to an initiation command. The method further comprises automatically processing the plurality of links, with each link being processed individually. In another respect, the invention is a computer readable medium on which is embedded computer software comprising a set of instructions for executing the above method. In yet another respect, the invention is a system configured to perform the above method.

20 Claims, 4 Drawing Sheets

SYSTEM AND METHOD FOR PROCESSING USER-SELECTED HYPERLINKS ON A WEB PAGE

FIELD OF THE INVENTION

This invention relates generally to data processing: database and file management; data structures; and document processing, and more particularly although not exclusively to hypermedia.

BACKGROUND OF THE INVENTION

The diversity and wealth of information available via the internet makes it a highly desirable medium to access. In general, a graphical user interface ("GUI") is utilized to access internet content (e.g., text, audio, images, files, etc.). The most common GUI used to access internet content today is a browser e.g., NETSCAPE NAVIGATOR, MICROSOFT INTERNET EXPLORER, etc. operating on a personal computer ("PC"). Much of the internet content is accessible as or via HTML-based (Hypertext Markup Language) Web pages. In order to access or process this content, a user generally uses a PC e.g., an APPLE MACINTOSH computer or a computer utilizing a MICROSOFT WINDOWS operating system. Web pages often have some form of user-selectable icons or links (e.g., button, fingernail image, etc.) that allow the user to view or access a referenced (or linked) Web page, image, or some other form of content.

A link may be processed in a variety of ways. For example, a new Web page may be generated, content may be printed or stored, audio content may be played, video content may be displayed, etc. The active Web page is defined as the Web page in which a pointer (e.g., a computer mouse pointer) is currently located.

Typically, when a link is selected while viewing a first Web page, the browser replaces the first Web page with the Web page referenced in the link. For example, if a user is viewing a main (or Home) Web page with links to auxiliary Web pages, and the user selects a link for one of the auxiliary Web page, the browser will display the auxiliary Web page. If the user then wishes to view the Home page again, the user will typically select the "back" icon. Additionally, if the user wishes to view a second auxiliary Web page, the user will typically go back to the Home page to select the link to the second auxiliary Web page. Utilizing this procedure, navigating Web pages may be quite time consuming. Moreover, it may be difficult to compare content of multiple Web pages in this manner. For users with slow internet connections, this method of internet navigation may be particularly frustrating because, to view multiple links, the user may waste time waiting for one link to download before being able to begin downloading the next link. Additionally, for users paying for time connected to the internet, downloading one Web page, viewing that page, navigating back, viewing a next page, etc. may waste time, and thus money. Moreover, traditional methods of Web navigation may be frustrating to users with fast internet connections because finding and selecting individual links may be the most time consuming part of Web browsing.

SUMMARY OF THE INVENTION

The invention is a method, a computer readable medium and a system for improving performance of a graphical user interface (GUI).

In one respect, the invention is a method for improving performance of a GUI. The method comprises identifying a plurality of links, wherein the identifying is performed in response to an initiation command. The method further comprises automatically processing the plurality of links, with each link being processed individually.

In another respect, the invention is a computer readable medium on which is embedded computer software comprising a set of instructions for executing a method of improving performance of a GUI. The method comprises identifying a plurality of links, wherein the identifying is performed in response to an initiation command. The method further comprises automatically processing the plurality of links, with each link being processed individually.

In yet another respect, the invention is a system for improving performance of a GUI. The system comprises a parser, wherein the parser is configured to identify a plurality of links in response to an initiation command. The system further comprises a thread generator, wherein the thread generator is configured to individually process each of the plurality of links.

In comparison to known prior art, certain embodiments of the invention are capable of achieving certain advantages, including some or all of the following: (1) More powerful Web navigation; (2) More versatile Web navigation; and (3) A greater ability to manage time resources. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

For simplicity and illustrative purposes, the principles of the invention are described by referring mainly to an exemplary embodiment thereof, particularly with references to a system to improve Web page navigation. However, one of ordinary skill in the art would readily recognize that the same principles are equally applicable to, and may be implemented in, a system capable of navigating multiple layers, screens or pages of content of any known GUI, and that any such variations are within the scope of the invention. While in the following description numerous specific details are set forth in order to provide a thorough understanding of an embodiment of the invention, in other instances, well known methods and structures have not been described in detail so as not to obscure the invention.

Figure 1:
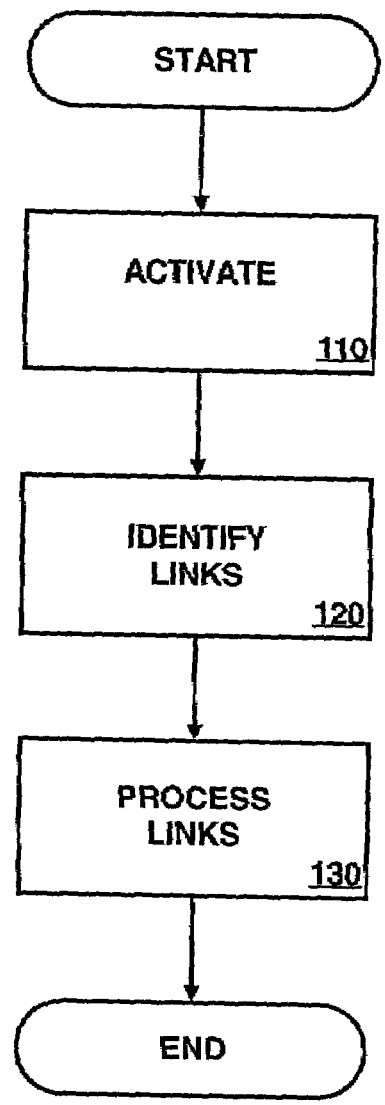
FIG. 1 is a flow chart of an exemplary method, according to an embodiment of the invention.

FIG. 1 is a flow chart of a method 100, according to an embodiment of the invention. The method 100 may enable a user of a browser to process every link within an active Web page. The method 100 may save user time in that the user need not select links individually. Additional user time may be saved because the user may not be required to scroll about within the Web page in order to find links to select.

Moreover, the method 100 may allow a user to view links that are non-obvious or hidden. For example, a link may be placed within or behind a graphical image. Furthermore, the method 100 may exist in a number of forms, several of which are described below.

In step 110, the method 100 is initiated or activated. The method 100 may be activated in a variety of ways, several of which are described in FIGS. 2 and 3. Additionally, it is within the scope of the invention that any known method of activating a computer readable medium may be utilized to activate the method 100 and thus, may be substituted for step 110. Following step 110, the method 100 may proceed to step 120.

In step 120, substantially every link within the active Web page is determined. For example, as described in FIG. 4, a parser may parse a corresponding source code of the active Web page and generate a list of links. The parser may identify links based on predetermined search criteria (e.g., http, www, etc.). Following step 120, the method 100 may proceed to step 130.

In step 130, each link of the list of links identified in step 120 may be processed. For example, as described in FIG. 4, a thread generator may spawn a browser process for each link of the list of links. Following step 130, the method 300 may end.

In a second embodiment the method 100 may process a subset of the links within the active Web page based on the content type of the links. The method 100 of the second embodiment is similar to the method 100 described above and thus only those features which are reasonably necessary for a complete understanding of the second embodiment are described below.

Although not shown in FIG. 1, in a process known to those skilled in the art, prior to or during the method 100, one or more content types (e.g., audio, video, file, banner, menu bar items, etc.) may be removed from the content types processed by the method 100. For example, within an internet options user interface, a dialog box may present the user with a user modifiable list of substantially all content types. By default, one or all content types may be selected for processing and the user may select or deselect one or more content types as desired. Any selected content types may be processed in steps 120 and/or 130 and any deselected content type may thus be removed from content types processed in steps 120 and/or 130. For example, if the video content type is deselected, substantially no video content will be processed in steps 120 and/or 130.

In a third embodiment the method 100 may process the links in a predefined manner. The method 100 of the third embodiment is similar to the method 100 described above and thus only those features which are reasonably necessary for a complete understanding of the third embodiment are described below.

Although not shown in FIG. 1, in a process similar to selecting content types described in the second embodiment, a mode of processing may be selected. For example, if a store mode is selected, Web content may be stored to memory in step 130. Stored Web content may subsequently be viewed, heard, printed, etc., as required, in response to a user request. In this manner, the user may more quickly and easily store Web content for later access. Thus, the user may save money and/or better manage time resources. For example, a user paying for time connected to the internet may save money by quickly storing Web content, disconnecting internet services, and subsequently viewing the stored content. In a second example, a user lacking uninterrupted internet access (e.g., a commuter, etc.) may better manage time resources by storing content for later access after being disconnected. While storing content has been discussed, in an alternative form, a print or attach to email mode may be selected in addition to or instead of the store mode.

Additionally, a mode of processing may be selected for each content type. For example, audio content may be stored, while video content may be displayed.

Furthermore, a batch mode of processing may be selected. In one form, the batch mode may process a predefined or user modified number of links. For example, if the batch mode is set to process ten (10) links, activating the method 100 within an active Web page containing more than ten (10) links may result in only ten (10) links being processed initially. Once the ten (10) links have been processed, the remaining or next ten (10) links may be processed. In another form, the batch mode may be configured to concurrently process no more than a predefined or user modified number of links. For example, if the batch mode is set to process two (2) links, then activating the method 100 within an active Web page containing more than two (2) links may result in only two (2) links being processed initially. Subsequently, if the user closes one or more of the processed links, additional links may be processed to bring the number up to two (2). In this manner, a user may quickly and easily compare a multitude of links.

In a fourth embodiment the method 100 may be accessed via one or more keystrokes, a combination of keystrokes, a computer peripheral button activation, etc. The method 100 of the fourth embodiment is similar to the method 100 previously described and thus only those features which are reasonably necessary for a complete understanding of the fourth embodiment are described below.

In a process known to those skilled in the art, button attributes of a computer peripheral may be modified to perform various function. For example, activating the right button of the computer mouse may be modified to initiate the method 100. Additionally, in a similar process, the attributes of one or more keys or a combination of keys may be modified such that the activation of the one or more keys or the combination of keys may initiate the method 100. For example, pressing the "Alt" key in combination with the "e" key may be configured to initiate the method 100.

Figure 2:
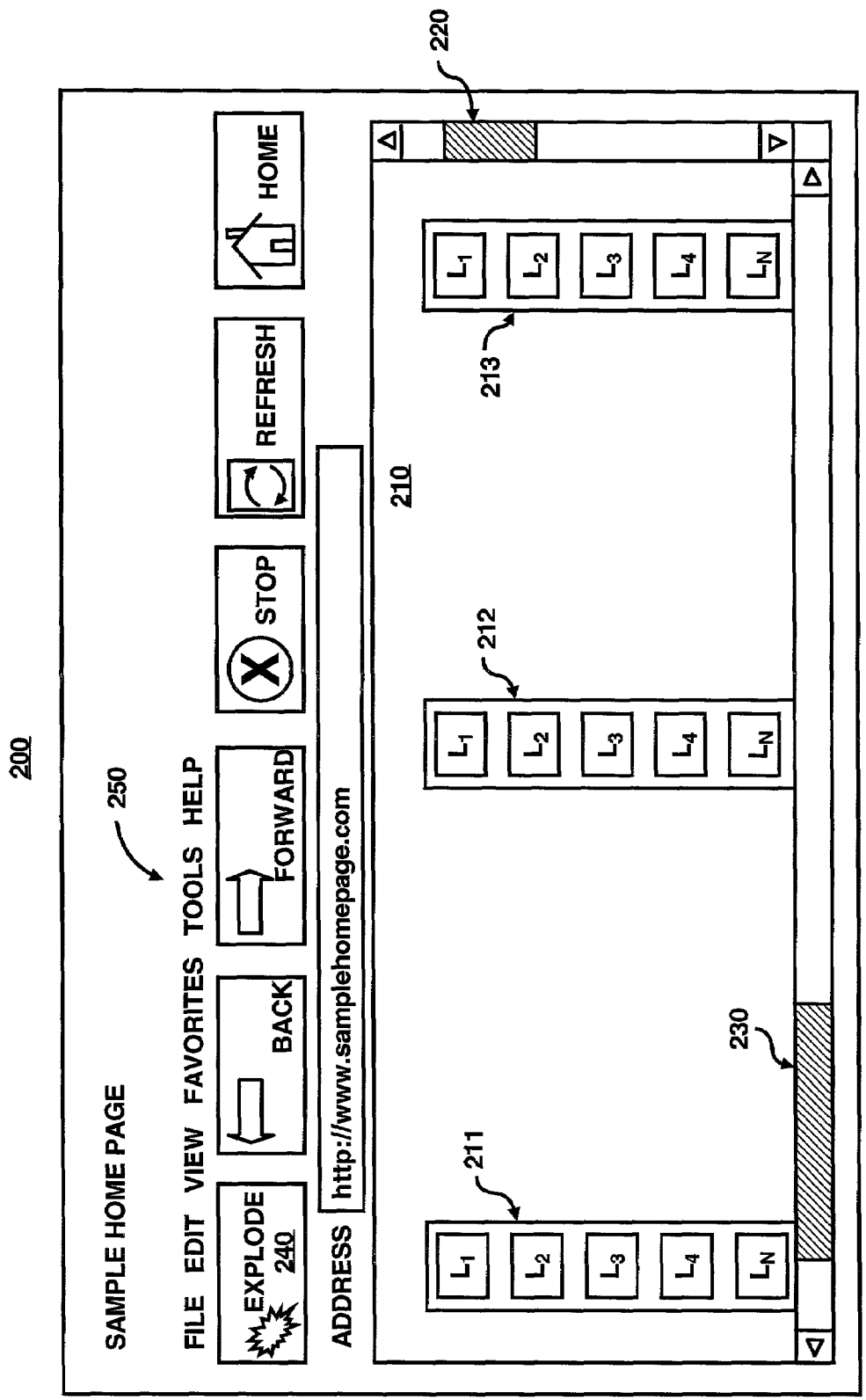
FIG. 2 illustrates an exemplary browser window, according to an embodiment of the invention.

FIG. 2 illustrates an exemplary browser window 200, according to an embodiment of the invention. As shown in FIG. 2, the browser window 200 includes a display area 210, scroll bars 220 and 230, an explode icon 240, and a pointer 250. Additionally, the browser window 200 and the explode icon 240 may exist in a variety of forms, several of which are discussed below.

The display area 210 enables a user to view a subset of the content of a Web page. The display area 210 includes three (3) columns of icons 211, 212 and 213. The icons within columns 211–213 represent links to various other pages of content. For example, within column 211, each icon $L_1$ to $L_n$ may link to a graphical image. Although not depicted in display area 210, the columns extend downward and may be viewed by scrolling down. For example, the scroll bar 220 may be utilized to view content above and/or below the current field of view. Additionally, the scroll bar 230 may be utilized to view content on either side of the current view.

In one form, the explode icon 240 may be configured to, at least, provide the user with the capability to initiate the method 100. Selecting the explode icon 240 may save user time in that the user need not select links individually. Additional user time may be saved because the user may not be required to scroll the page in order to find links to select.

Moreover, selecting the explode icon 240 may allow a user to view links that are non-obvious or hidden. For example, a link may be placed within or behind a graphical image.

In another form, a tools menu 250 may be configured to, at least, provide the user with the capability to select attributes associated with the method 100. For example, the tools menu 250 may be accessed in order to select one or more attributes. Although not shown in FIG. 2, in a process known to those skilled in the art, an internet options user interface may be accessed. Modifying the method 100 in this manner may provide the user with the capability to optimize the method 100 to the user's needs.

In yet another form, a subset, or group of links may be selected by the user. For example, a user could depress the left mouse button and "drag" the pointer 250 across and/or down the active Web page ("Mouse-Drag") to select a group of links. Selected links could subsequently be processed in response to selecting the explode icon 240. Although the Mouse-Drag method of selecting groups of links may appear superficially similar to various other methods of selecting groups of links in which links are individually selected, the Mouse-Drag method according to an exemplary embodiment of the invention enables a user to select multiple links in fewer actions, thus increasing efficiency.

Figure 3:
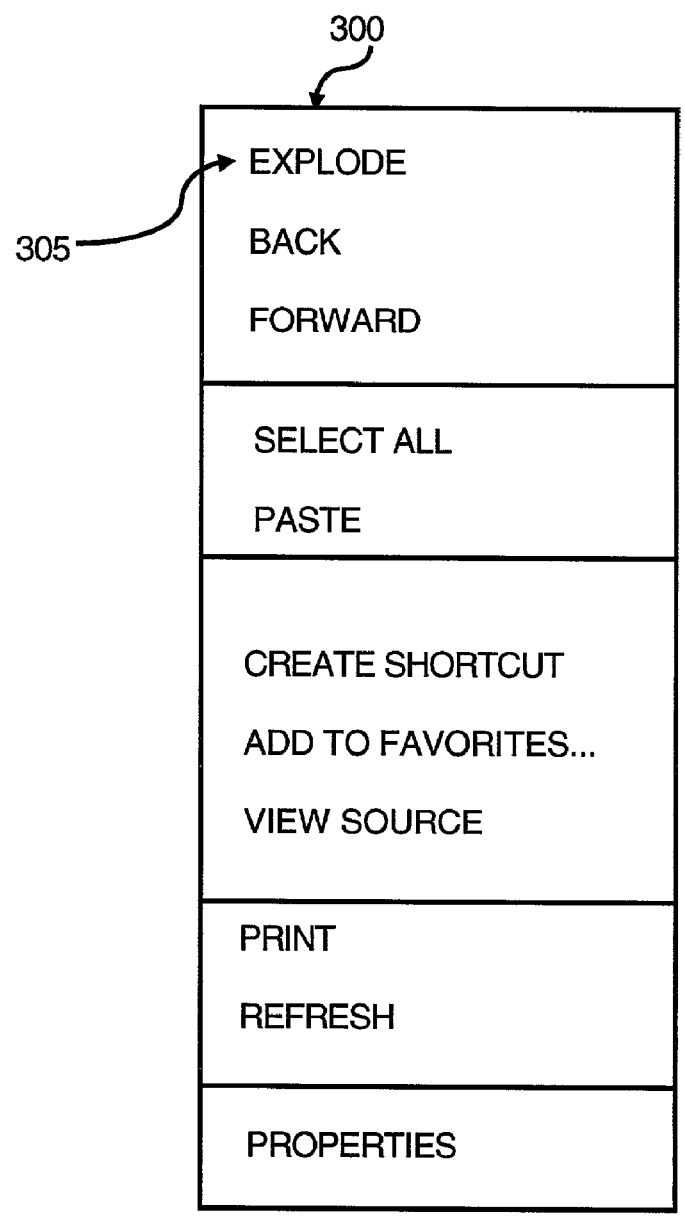
FIG. 3 illustrates an exemplary popup toolbar, according to an embodiment of the invention.

In another embodiment, as shown in FIG. 3, the explode feature may be accessed via a popup menu. The explode feature of the below embodiment is similar to the explode feature described above and thus only those features which are reasonably necessary for a complete understanding of the second embodiment are described below.

FIG. 3 illustrates an exemplary popup menu 300, according to an embodiment of the invention. As shown in FIG. 3, the popup menu 300 includes an explode menu item 305. In a preferred form, the popup menu 300 may be accessed via a right-click of a mouse or equivalent computer peripheral operation within the active Web page. In a manner similar to the explode icon 240 of FIG. 2, selecting the explode menu item 305 may initiate the method 100.

Figure 4:
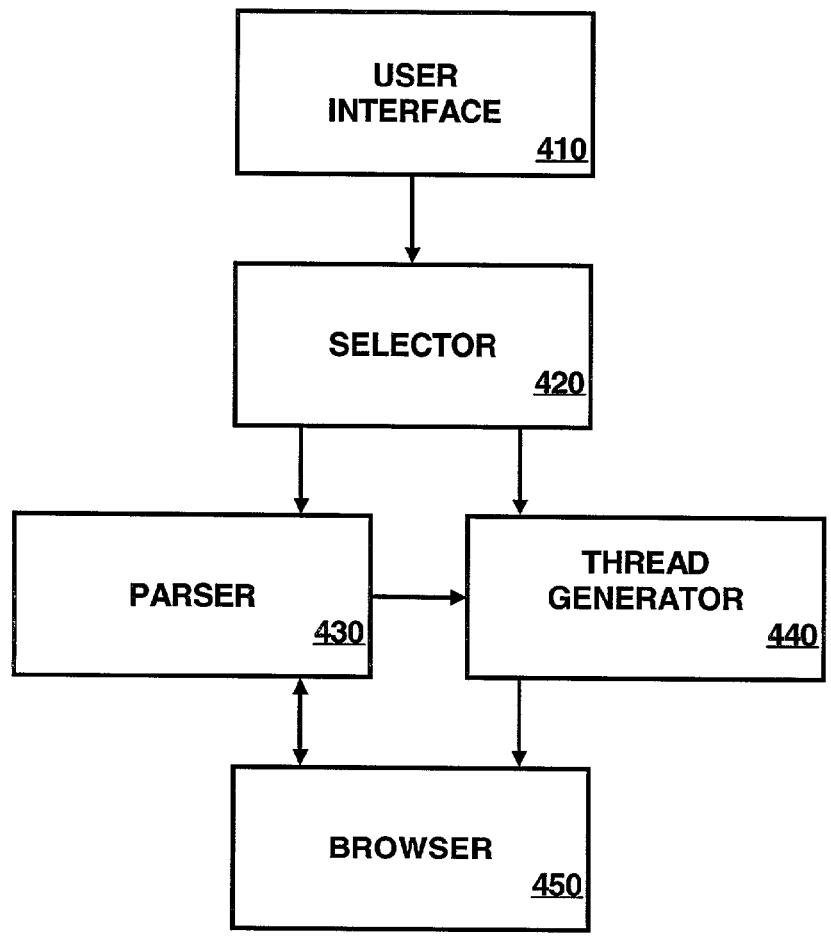
FIG. 4 illustrates an exemplary software architecture, according to an embodiment of the invention.

FIG. 4 illustrates an exemplary software architecture 400, according to an embodiment of the invention. As shown in FIG. 4, the software architecture 400 includes a user interface 410, a selector 420, a parser 430, a thread generator 440 and a browser 450.

The user interface 410 may be configured to provide a user with the capability to select options as described above. The user interface 410 may further be configured to forward selected options to the selector 420.

The selector 420 may be configured to accept and store options forwarded by the user interface 410. The selector 420 may further be configured to forward options, as required, to the parser 430 and/or the thread generator 440.

The parser 430 may be configured to perform, at least, step 120 of method 100. For example, in response to initiation, the parser 430 may be configured to communicate with the browser 450 and access the source code of the active Web page. The parser 430 may further be configured to identify links within the source code. The links may be identified based on predefined search criteria. The parser 430 may further be configured to generate a list of links. The parser 430 may further be configured to accept options from the selector 420. Based on the options, the parser 430 may or may not include certain content types in the list of links. For example, the parser 430 may reference the options and edit the list of links to remove links based on the content type of the links. The parser 430 may further be configured to forward the list of links to the thread generator 440.

The thread generator 440 may be configured to perform, at least, step 130 of method 100. For example, in response to receiving the list of links from the parser 430, the thread generator 440 may be configured to communicate with the browser 450 and to individually forward each link of the list of links to the browser 450, such that a new browser process is initiated for each link. The thread generator 440 may further be configured to accept options from the selector 420. Based on the options, the thread generator 440 may specify to the browser 450 the type of process to be initiated for each link.

The browser 450 may include any known system capable of accessing internet content. In a preferred form, the browser 450 may be configured to perform the method 100. For example, the function of the software architecture 400 may be subsumed within the browser 450. However, it is within the scope of the invention that any browser capable of being configured to communicate with the software architecture 400 may be included.

The method 100 may exist in a variety of active and inactive forms. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for improving performance of a graphical user interface (GUI), the method comprising:
    identifying a plurality of links on a Web page, wherein the identifying is performed in response to an initiation command;
    graphically selecting a subset or group of the plurality of links on the Web page via the graphical user interface by an end user;
    editing the plurality of links and the selected subset or group of links on the Web page by the end user; and
    automatically processing the plurality of links and the selected subset or group of links on the Web page, with each link being processed individually.

2. The method of claim 1, further comprising: editing the plurality of links, wherein the editing is based on at least one option.

3. The method of claim 2, wherein the at least one option is selected by a user.

4. The method of claim 1, wherein the identifying further comprises: reading a source code of a Web page; and
determining a plurality of links within the Web page based on predefined criteria.

5. The method of claim 1, wherein the automatic processing further comprises:
processing the plurality of links in a batch mode.

6. The method of claim 1, wherein each of the plurality of links comprises at least one content type, the content type being one or more of image, text, video, audio, data and computer code.

7. The method of claim 6, further comprising:
specifying the process performed on the plurality of links, wherein the specified process is at least one of downloading, opening, playing, storing and printing.

8. The method of claim 7, wherein specifying the process further comprises: specifying the process based on the content type.

9. A computer readable medium on which is embedded computer software comprising a set of instructions for executing a method of improving performance of a graphical user interface (GUI), the method comprising:
identifying a plurality of links on a Web page, wherein the identifying is performed in response to an initiation command;
graphically selecting a subset or group of the plurality of links on the Web page via the graphical user interface by an end user;
editing the plurality of links and the selected subset or group of links on the Web page by the end user; and
automatically processing the plurality of links and the selected subset or group of links, with each link being processed individually.

10. The computer readable medium of claim 9, wherein the method further comprises: editing the plurality of links, wherein the editing is based on an option, the option having been selected by a user.

11. The computer readable medium of claim 9, wherein the identifying further comprises:
reading a source code of a Web page; and
determining a plurality of links within the Web page based on predefined criteria.

12. The computer readable medium of claim 9, wherein each of the plurality of links comprises at least one content type, the content type comprising one or more of image, text, video, audio, data and computer code.

13. The computer readable medium of claim 12, wherein the method further comprises:
specifying the process performed on the plurality of links, wherein the specified process is at least one of downloading, opening, playing, storing and printing.

14. A system for improving performance of a graphical user interface (GUI), the system comprising:
a parser, wherein the parser is configured to identify a plurality of links on a Web page in response to an initiation command;
a graphical pointer configured to graphically select a subset or group of the plurality of links on the Web pane via the graphical user interface by an end user, wherein the parser is configured to edit the plurality of links on the Web page and the selected subset or group of links on the Web page based on the end user's selection; and
a thread generator, wherein the thread generator is configured to individually process each of the plurality of links on the Web page.

15. The system of claim 14, further comprising:
a user interface configured to provide a selection of one or more options; and
a selector configured to accept the one or more options, and to forward the one or more options to at least one of the parser and the thread generators.

16. The system of claim 15, wherein the parser is further configured to edit the plurality of links and the selected subset or group of links based on the selection of one or more options.

17. The system of claim 16, wherein the thread generator is further configured to process the plurality and the selected subset or group of links of links based on the selection of one or more options.

18. The system of claim 14, wherein the parser is further configured to communicate with a browser to access a source code of a Web page and to identify the plurality of links based on the source code.

19. The system of claim 18, wherein the thread generator is further configured to communicate with a browser and to forward the plurality of links to the browser for processing.

20. The system of claim 14, wherein the thread generator is further configured to process the plurality of links in a batch mode.

* * * * *

UNITED STATES PATENT AND TRADEMARK OFFICE
CERTIFICATE OF CORRECTION

| | |
|---|---|
| PATENT NO. | : 7,024,629 B2 |
| APPLICATION NO. | : 09/939630 |
| DATED | : April 4, 2006 |
| INVENTOR(S) | : Andrew P. Alegria et al. |

Page 1 of 1

It is certified that error appears in the above-identified patent and that said Letters Patent is hereby corrected as shown below:

In column 4, line 55, delete "$L_l$ to $L_n$" and insert -- $L_1$ to $L_n$ --, therefor.

In column 8, line 13, in Claim 14, delete "Web pane" and insert -- Web page --, therefor.

Signed and Sealed this

Second Day of June, 2009

JOHN DOLL
*Acting Director of the United States Patent and Trademark Office*